United States Patent
Suddreth et al.

(10) Patent No.: US 8,576,094 B2
(45) Date of Patent: Nov. 5, 2013

(54) METHOD AND SYSTEM FOR DISPLAYING NAVIGATION CORRIDORS

(75) Inventors: John G. Suddreth, Cave Creek, AZ (US); Sergio Cecutta, Scottsdale, AZ (US); Frank Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1176 days.

(21) Appl. No.: 12/201,309

(22) Filed: Aug. 29, 2008

(65) Prior Publication Data

US 2010/0052949 A1   Mar. 4, 2010

(51) Int. Cl.
G01C 21/00  (2006.01)
G06T 17/00  (2006.01)

(52) U.S. Cl.
USPC .......................................... 340/972; 345/428

(58) Field of Classification Search
USPC ..................................................... 340/995.19
See application file for complete search history.

(56) References Cited

U.S. PATENT DOCUMENTS

| | | | |
|---|---|---|---|
| 5,798,713 A | | 8/1998 | Viebahn et al. |
| 5,945,926 A * | | 8/1999 | Ammar et al. ................. 340/970 |
| 7,783,393 B2 * | | 8/2010 | Tucker et al. ..................... 701/4 |
| 2001/0040534 A1 * | | 11/2001 | Ohkawara et al. ................ 345/7 |
| 2004/0140912 A1 * | | 7/2004 | Alfredsson et al. ........... 340/945 |
| 2004/0160341 A1 * | | 8/2004 | Feyereisen et al. ........... 340/970 |
| 2005/0182528 A1 * | | 8/2005 | Dwyer et al. ...................... 701/3 |
| 2006/0287826 A1 * | | 12/2006 | Shimizu et al. ............... 701/216 |
| 2008/0140270 A1 | | 6/2008 | Davis et al. |
| 2008/0309518 A1 * | | 12/2008 | Aung ............................. 340/979 |
| 2009/0207048 A1 * | | 8/2009 | He et al. ........................ 340/973 |
| 2009/0319095 A1 * | | 12/2009 | Cech et al. ......................... 701/1 |

FOREIGN PATENT DOCUMENTS

WO   2004070677 A   8/2004

OTHER PUBLICATIONS

European Patent Office "European Search Report," dated Oct. 15, 2009 for European Patent Application No. EP 09 16 8638.

* cited by examiner

*Primary Examiner* — Brian Zimmerman
*Assistant Examiner* — Cal Eustaquio
(74) *Attorney, Agent, or Firm* — Ingrassia Fisher & Lorenz, P.C.

(57) ABSTRACT

Methods and systems for operating a display device associated with a vehicle are provided. A first image is caused to be displayed on the display device. The first image is at least representative of an actual terrain over which the vehicle is navigating. A second image is rendered over the first image on the display device. The second image includes a digital navigation corridor boundary corresponding to an actual navigation corridor boundary of an actual navigation corridor in which the vehicle is navigating. A luminance of at least a portion the digital navigation boundary on the display device is increased based on a proximity of a trajectory of the vehicle to the actual navigation corridor boundary.

20 Claims, 6 Drawing Sheets

METHOD AND SYSTEM FOR DISPLAYING NAVIGATION CORRIDORS

TECHNICAL FIELD

The present invention generally relates to vehicular display devices, and more particularly relates to methods and systems for displaying navigation corridors on display devices associated with vehicles.

BACKGROUND

Air traffic management often utilizes predefined navigation corridors to direct aircraft through and/or around particular areas to ensure, for example, that the operation of the aircraft is in compliance with the guidelines of various authoritative administrations (e.g., the Federal Aviation Administration (FAA) and the International Civil Aviation Organization (ICAO)). One type of such navigation corridors are those defined by Required Navigation Performance (RNP). RNP requires that an aircraft must be able to navigate a chosen flight plan (e.g., an approach for landing) within a particular tolerance and alert the pilot when the tolerance is exceeded.

Modern aircraft often include various displays for simultaneously displaying several types of information to a user (e.g., the pilot). Primary flight displays (PFD) and head-up displays (HUDs) often that project various symbols and information over an image of the environment outside the aircraft. More specifically, primary flight displays typical make use of an artificial image of the environment (e.g., a digital terrain) while HUDs include a transparent display, or image combiner, through which the may views the exterior. In modern implementations of both, various "symbology" is rendered over the image of the exterior of the aircraft to indicate various operational conditions to the user. There is a need for a method and system for using such displays in such a way as to indicate to the user when the aircraft is deviating from its flight plan and/or is in danger of exiting a navigation corridor in which it is operating.

Accordingly, it is desirable to provide a method and system for operating a display device associated with an aircraft in such a way as to indicate to the user when the aircraft is within a particular proximity to a boundary of the navigation corridor while minimizing the amount of clutter on the display. Furthermore, other desirable features and characteristics of the present invention will become apparent from the subsequent detailed description of the invention and the appended claims, taken in conjunction with the accompanying drawings and this background of the invention.

BRIEF SUMMARY

A method for operating a display device associated with a vehicle is provided. A first image is caused to be displayed on the display device. The first image is at least representative of an actual terrain over which the vehicle is navigating. A second image is rendered over the first image on the display device. The second image includes a digital navigation corridor boundary corresponding to an actual navigation corridor boundary of an actual navigation corridor in which the vehicle is navigating. A luminance of at least a portion the digital navigation boundary on the display device is increased based on a proximity of a trajectory of the vehicle to the actual navigation corridor boundary.

A method for operating a display device on-board an aircraft is provided. A first image is caused to be displayed on the display device. The first image is at least representative of a view of a user on-board the aircraft. A second image is rendered over the first image on the display device. The second image includes a digital navigation corridor boundary corresponding to an actual navigation corridor boundary of the actual navigation corridor in which the aircraft is navigating. A luminance of at least a portion of the digital navigation boundary on the display device is increased based on a proximity of a flight path of the aircraft to the actual navigation corridor boundary.

An avionics system is provided. The avionics system includes a display device that is viewable by a user of an aircraft and a processor in operable communication with the display device. The processor is configured to generate a first image on the display device, the first image being representative of an actual terrain over which the aircraft is navigating, generate a second image over the first image on the display device, the second image comprising a digital navigation corridor boundary corresponding to an actual navigation corridor boundary of an actual navigation corridor in which the aircraft is navigating, and increase a luminance of at least a portion the digital navigation boundary on the display device based on a proximity of a trajectory of the aircraft to the actual navigation corridor boundary.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-6 are merely illustrative and may not be drawn to scale.

FIG. 1 to FIG. 6 illustrate methods and systems for operating a display device associated with (e.g., on-board) a vehicle (e.g., an aircraft). A first image is caused to be displayed on the display device. The first image is at least representative of an actual terrain over which the vehicle is navigating. A second image is rendered over the first image on the display device. The second image includes a digital navigation corridor boundary (e.g., a wall, ceiling, and/or floor) corresponding to an actual navigation corridor boundary of an actual navigation corridor in which the vehicle is navigating. A luminance of at least a portion the digital navigation boundary on the display device is increased based on a proximity of a trajectory (e.g., a flight path and/or a flight plan) of the vehicle to the actual navigation corridor boundary (e.g., a deviation of the aircraft from a desired flight plan).

Figure 1:
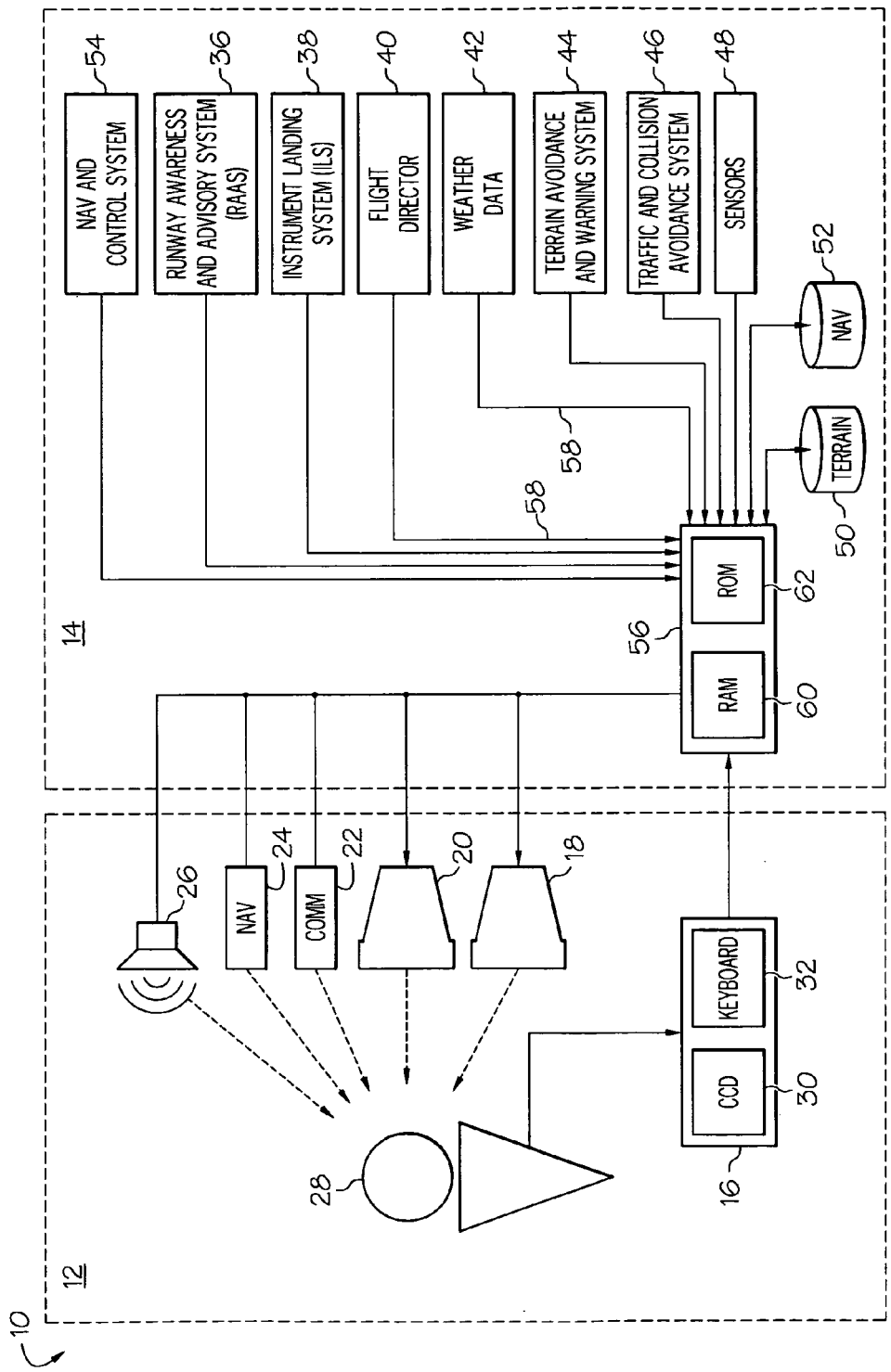
FIG. 1 is a schematic block diagram of an aircraft, according to one embodiment of the present invention.

FIG. 1 schematically illustrates a vehicle 10, such as an aircraft, according to one embodiment of the present invention. The aircraft 10 may be, in one embodiment, any one of a number of different types of aircraft such as, for example, a private propeller or jet engine driven airplane, a commercial jet liner, or a helicopter. In the depicted embodiment, the aircraft 10 includes a flight deck 12 (or cockpit) and an avionics/flight system 14. Although not specifically illustrated, it should be understood that the aircraft 10 also includes a frame or body to which the flight deck 12 and the avionics/flight system 14 are connected, as is commonly understood. It should also be noted that aircraft 10 is merely exemplary and could be implemented without one or more of the depicted components, systems, and data sources. It will additionally be appreciated that the aircraft 10 could be implemented with one or more additional components, systems, or data sources.

The flight deck 12 includes a user interface 16, display devices (or displays) 18 and 20, a communications radio 22, a navigational radio 24, and an audio device 26.

The user interface 16 is configured to receive input from a user 28 (e.g., a pilot) and, in response to user input, supply command signals to the avionics/flight system 14. The user interface 16 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 16 includes a CCD 30 and a keyboard 32. The user 28 uses the CCD 30 to, for example, move a cursor symbol on the display devices 18 and 20, and uses the keyboard 32 to, for example, input textual data.

Still referring to FIG. 1, the display devices 18 and 20 are used to display various images and data, in graphic, iconic, and/or textual formats, and to supply visual feedback to the user 28 in response to the user input commands supplied by the user 28 to the user interface 16. The display devices 18 and 20 may each be implemented using any one of numerous known displays suitable for rendering image and/or text data in a format viewable by the user 28, such as cathode ray tube (CRT) displays, liquid crystal displays (LCD), thin film transistor (TFT) displays, or organic light-emitting diode (OLED) displays. In one embodiment, display device 18 is a "head-down" primary flight display (PFD). However, it should be understood that the display devices 18 and 20 may also be implemented as head-up displays (HUD) on a fixed image combiners. Additionally, one or more of the display devices 18 and 20 may be implemented as a near-to-eye (NTE) display coupled to a headset (not shown) for the user 28.

The communication radio 22 is used, as is commonly understood, to communicate with entities outside the aircraft 10, such as air-traffic controllers and pilots of other aircraft. The navigational radio 24 is used to receive from outside sources and communicate to the user various types of information regarding the location of the vehicle, such as Global Positioning Satellite (GPS) system and Automatic Direction Finder (ADF) (as described below). The audio device 26 is, in one embodiment, an audio speaker mounted within the flight deck 12.

As shown in FIG. 1, the avionics/flight system 14 includes a runway awareness and advisory system (RAAS) 36, an instrument landing system (ILS) 38, a flight director 40, a weather data source 42, a terrain avoidance warning system (TAWS) 44, a traffic and collision avoidance system (TCAS) 46, a plurality of sensors 48 (e.g., a barometric pressure sensor, a thermometer, and a wind speed sensor), one or more terrain databases 50, one or more navigation databases 52, a navigation and control system (or navigation computer) 54, and a processor 56. The various databases 50 and 52 may have data stored thereon related to, for example, pre-existing flight plans and Required Navigation Performance (RNP) buffers on opposing sides of the flight plans, as is commonly understood.

The various components of the avionics/flight system 14 are in operable communication via a data bus (or avionics bus) 58. Although not illustrated, the navigation and control system 54 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor, or processing system, 56 may be a general-purpose controller or an application specific processor that operate in response to program instructions, such as field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 60 and on-board ROM (read only memory) 62. The program instructions that control the processor 56 may be stored in either or both the RAM 60 and the ROM 62. For example, the operating system software may be stored in the ROM 62, whereas various operating mode software routines and various operational parameters may be stored in the RAM 60. The RAM 60 and/or the ROM 62 may include instructions stored thereon for carrying out the methods and processes described below. It will be appreciated that this is merely exemplary of one scheme for storing operating system software and software routines, and that various other storage schemes may be implemented. It will also be appreciated that the processor 56 may be implemented using various other circuits, not just a programmable processor. For example, digital logic circuits and analog signal processing circuits could also be used.

During operation, the processor 56 receives various types of information about the position and orientation of the aircraft 10 from, for example, the GPS system, the ADF, the compass, the altimeter, the ADS, as well information about the terrain over which the aircraft 10 is flying from, for example, the terrain and navigational databases 50 and 52 to generate a perspective view of the terrain as seen from the aircraft (e.g., a field of view of the user 28 looking through a window or a windshield of the aircraft 10). In an embodiment in which the display device in question is a head-down display, the image generated includes a digital terrain image as described below. In an embodiment in which the display device is a HUD, the image of the terrain is simply the user's 28 field of view of the terrain through the image combiner of the HUD, as is commonly understood (although synthetic vision features may be displayed on the image combiner to enhance the user's view of the terrain).

Figure 2:
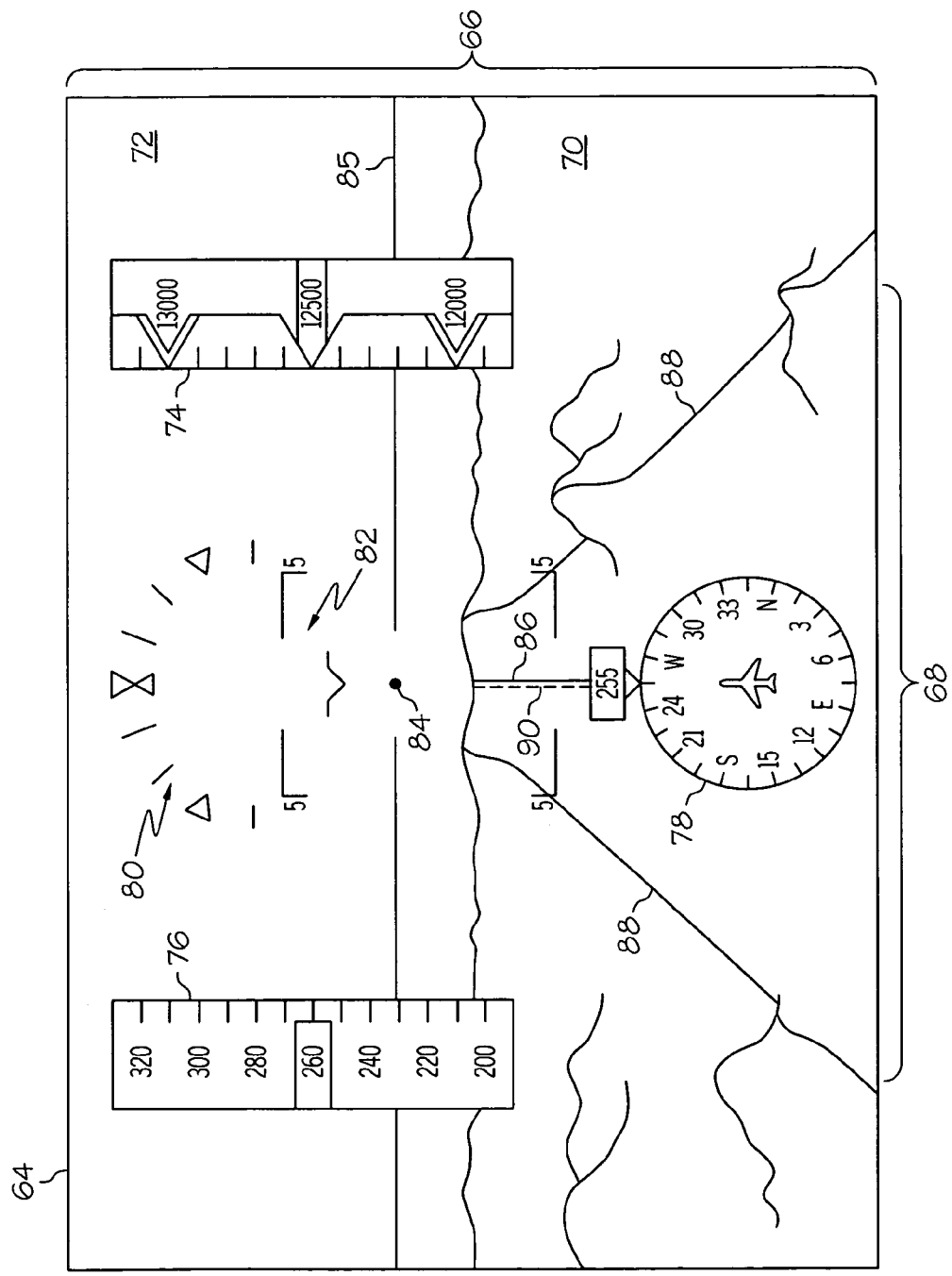
FIG. 2 is a plan view of a display screen of a display device on-board the aircraft of FIG. 1, illustrating the operation thereof with the aircraft in a first position over an actual terrain, according to one embodiment of the present invention.

FIG. 2 illustrates a display screen 64 of display device 18 during operation, according to one embodiment of the present invention, as the aircraft 10 is in a first position over a portion of terrain (i.e., actual terrain). On the display screen 64 are shown a terrain image 66 and a symbology image (or simply "symbology") 68. The terrain image 66 is at least representative of the user's 28 view from the flight deck 12. In the exemplary embodiment shown in FIG. 2, the terrain image 66 depicts a perspective view from the aircraft 10 of the terrain outside the aircraft 10 and covers substantially the entire display screen 64. The terrain image 66 includes a terrain portion 70 and a sky portion 72. As is commonly understood, in an embodiment in which the display device in use is a head-down display, such as an LCD display, the terrain image 66 is generated based on multiple readings from various instruments onboard the aircraft 10 that provide a current position and/or orientation (e.g., heading) of the aircraft 10 and changes as the position and/or orientation of the aircraft 10 changes, as well as the terrain and navigational databases 50 and 52 (FIG. 1). As indicated on FIG. 2, terrain features (e.g., hills, mountains, valleys, etc.) may be shown on the terrain image 66 to assist the user 28 with the operation of the aircraft 10. In an embodiment in which the display screen 64 is an image combiner of a HUD, the terrain image 66 is simply the user's 28 view of the terrain (and/or the interior of the flight deck 12) as seen through the display screen 64 (i.e., an image combiner).

Still referring to FIG. 2, the symbology 68 is displayed over terrain image 66. The symbology 68 includes multiple digital instruments that provide, among other things, an indication of a position and/or orientation (i.e., heading, pitch, roll, etc.) of the aircraft 10 to the user 28. In the depicted embodiment, the symbology 68 includes an altitude indicator 74, an airspeed indicator 76, a heading indicator 78, a roll indicator 80, and a pitch indicator 82. In the embodiment illustrated, the altitude indicator 74 and the airspeed indicator 76 are displayed as an altitude tape and an airspeed tape, respectively, as is commonly understood. The heading indicator 78 is graphically displayed as a compass at a lower center portion of the display screen 64. The roll indicator 80 is displayed above the heading indicator 78 at an upper portion of the display screen 64, and the pitch indicator 82 is positioned between the heading indicator 78 and the roll indicator 80. The pitch indicator 82 includes an aircraft pitch symbol 84 that indicates the direction in which a nose of the aircraft 10 is pointing, regardless of the actual direction of flight, as is commonly understood. The pitch indicator 82 may also be understood to include a horizon line (or a zero pitch reference line) 85. In the embodiment shown, in order to accurately represent the curved surface of the terrain (i.e., the planet), the horizon line 85 is positioned slightly above the boundary between the terrain portion 70 and the sky portion 72 of the terrain image 66. As such, the horizon line 85 may be considered to be part of either the terrain image 66 or the symbology image 68, or alternately part of neither.

Still referring to FIG. 2, on the display screen 64 are also shown, as part of either the terrain image 66 and/or symbology 68, a flight plan indicator 86 and navigation corridor boundary traces 88 on opposing sides of the flight plan indicator 86, all of which are shown as lines that follow the contours of the terrain portion 70 of the terrain image 66. As will be appreciated by one skilled in the art, the locations of the traces 86 and 88 on the display screen 64 may be calculated based on various sources of information available to the processor 56, such as the location of the aircraft 10 and the RNP data stored on the databases 50 and 52. As such, the flight plan indicator 86 and the corridor boundary traces 88 may be understood, at least for the purposes of this description, to accurately represent an actual (and/or desired) flight plan of the aircraft 10 and an actual RNP buffer zone around the actual flight plan, which jointly form a navigation corridor, such as an approach corridor for landing (e.g., as published by regulatory administrations, such as the Federal Aviation Administration (FAA)).

Also shown on the display screen 64 is a flight path marker 90, which is shown as a dashed line and may not be visible to the user 28. As is commonly understood, the flight path (and the flight path marker 90) indicates the direction in which the aircraft is flying, regardless of the orientation of the nose of the aircraft. For the purposes of this description, it should be assumed that the flight path marker 90 accurately depicts the actual flight path of the aircraft 10 relative to the "real-world" counterparts of the other items shown on the display screen 64, such as the actual flight plan and the RNP boundaries.

Still referring to FIG. 2, in the first position, the aircraft 10 is flying substantially directly over the flight plan indicator 86 (and thus the actual flight plan) as indicated by the congruence of the flight plan indicator 86 and the flight path 90.

According to one aspect of the present invention, a digital navigation corridor boundary (e.g., a wall, ceiling, and/or floor), corresponding to an actual navigation corridor boundary of an actual navigation corridor in which the vehicle is navigating, is displayed on the screen 64 with the luminance and/or transparency thereof being based on a proximity of a "trajectory" of the aircraft 10 to the actual navigation corridor boundary. The trajectory of the aircraft 10 may refer to an instantaneous flight path (as indicated by the flight path marker 90), a predicted flight path (e.g., as determined by the processor 56 based on the current operational state of the aircraft), or an "on-board" flight plan (e.g., as determined by the FMS). As referred to above, the navigation corridor boundaries may be those of a desired, or ideal, flight plan for flying through a particular airspace, as published by a regulatory administration.

Figure 3:
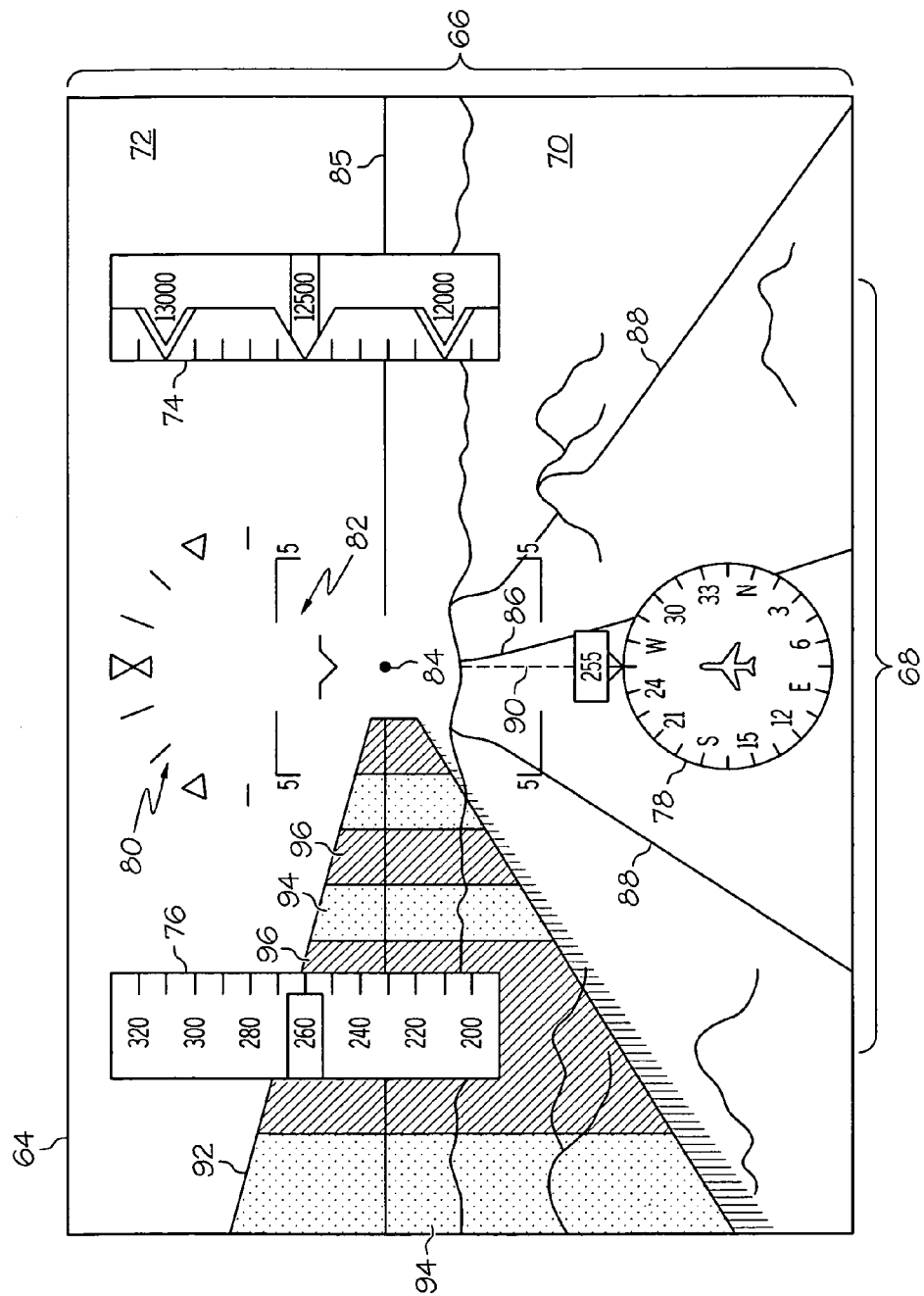
FIG. 3 is a plan view of the display screen of FIG. 2, illustrating the operation thereof with the aircraft in a second position over the actual terrain.

As illustrated in FIG. 3, in one embodiment, when the aircraft 10 deviates a predetermined amount from the flight plan 86 or navigates towards the one of the traces 88 (as indicated by the separation between the flight plan 86 and the flight path 90), a digital navigation corridor wall (or boundary) 92 is displayed (e.g., over the terrain image 66 and "under" the symbology 68) in a position such that is appears to be over (or extend upwards from) the respective boundary trace 88. For example, in FIG. 3, the aircraft 10 has navigated towards the boundary trace 88 on the port side of the aircraft 10 (i.e., into a second position). Thus, a navigation corridor boundary 92 is displayed (i.e., the luminance thereof is increased from a zero value or the transparency thereof has been decreased from 100%) over the boundary trace 88 on the port side. As shown, the corridor wall 92 is partially transparent, as indicated by the terrain portion 70 of the terrain image 66 being visible therethrough. The corridor wall 92 is comprised of an alternating set of first 94 and second 96 wall segments, with the second wall segments 96 being "darker" or less transparent (or more luminous) than the first segments 94. In one embodiment, the corridor wall 92 is stationary relative to the terrain image 66. As a result, the first 94 and second segments 96 provide the user 28 with a sense of motion (i.e., speed) as the aircraft 10 passes by. In one embodiment, the luminance of the corridor wall 92 fades as the corridor wall 92 extends downwards towards the respective boundary trace 88.

Figure 4:
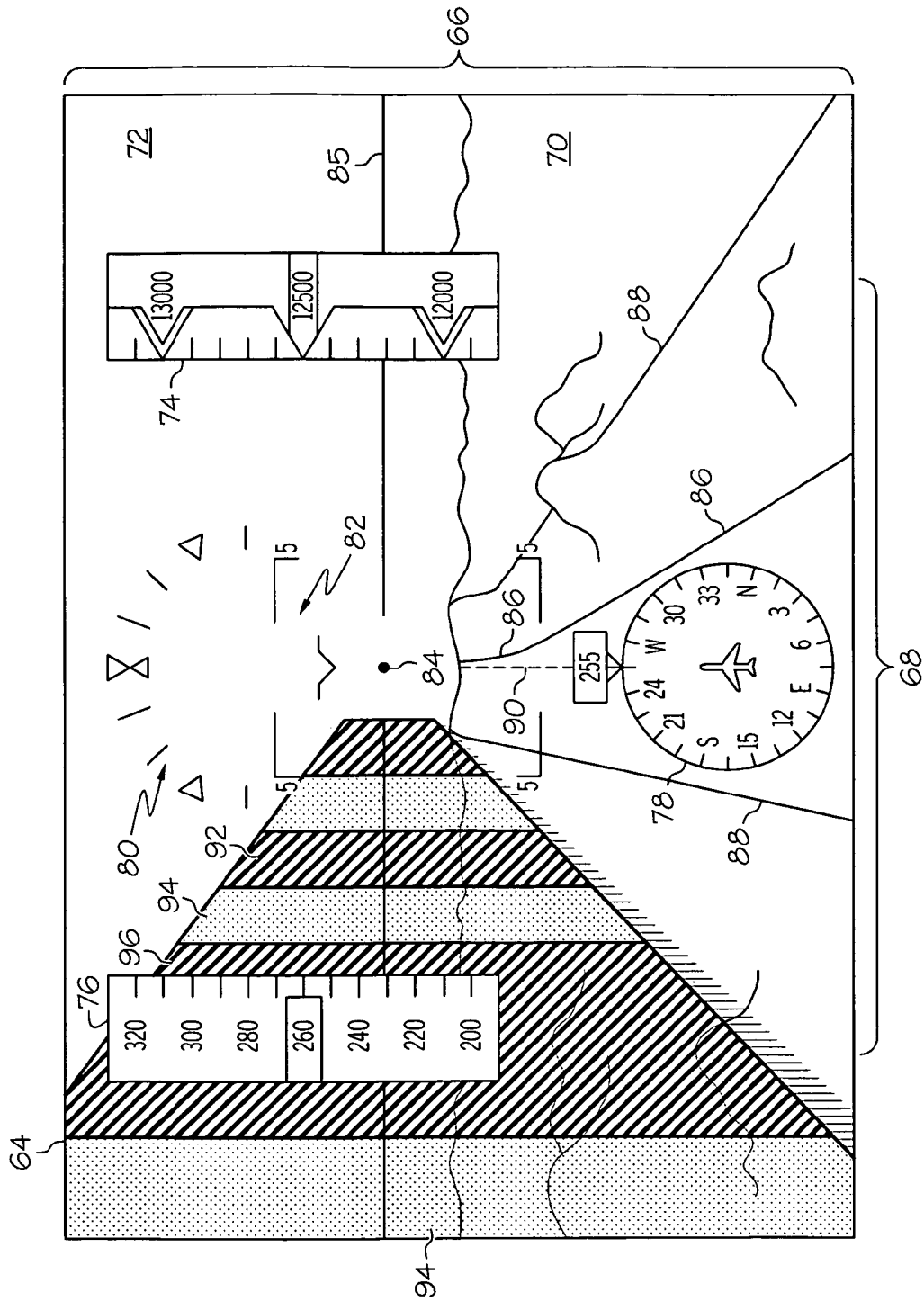
FIG. 4 is a plan view of the display screen of FIG. 2, illustrating the operation thereof with the aircraft in a third position over the actual terrain.

FIG. 4 illustrates the display screen 64 after the aircraft 10 has further navigated towards the boundary trace 88 (i.e., into a third position) on the port side of the aircraft 10. As shown, the luminance of the corridor wall 92, both the first 94 and second 96 segments, has been increased such that the corridor wall 92 is darker or less transparent than shown in FIG. 3. In one embodiment, as the aircraft 10 approaches the corridor wall 92, the corridor wall 92 achieves a maximum luminance and/or minimum transparency (e.g., 50%) such that the terrain image 66 is still visible therethrough. It should be noted that in other embodiments the luminance and/or transparency of the corridor walls 92 may be varied such that the wall 92 may appear to be "solid" (i.e., 0% transparency), and the corridor wall 92 may be textured. Additionally, the perspective with which the corridor wall 92 is shown has appropriately changed to indicate that the distance between the aircraft 10 and the corridor wall 92 has been decreased.

Figure 5:
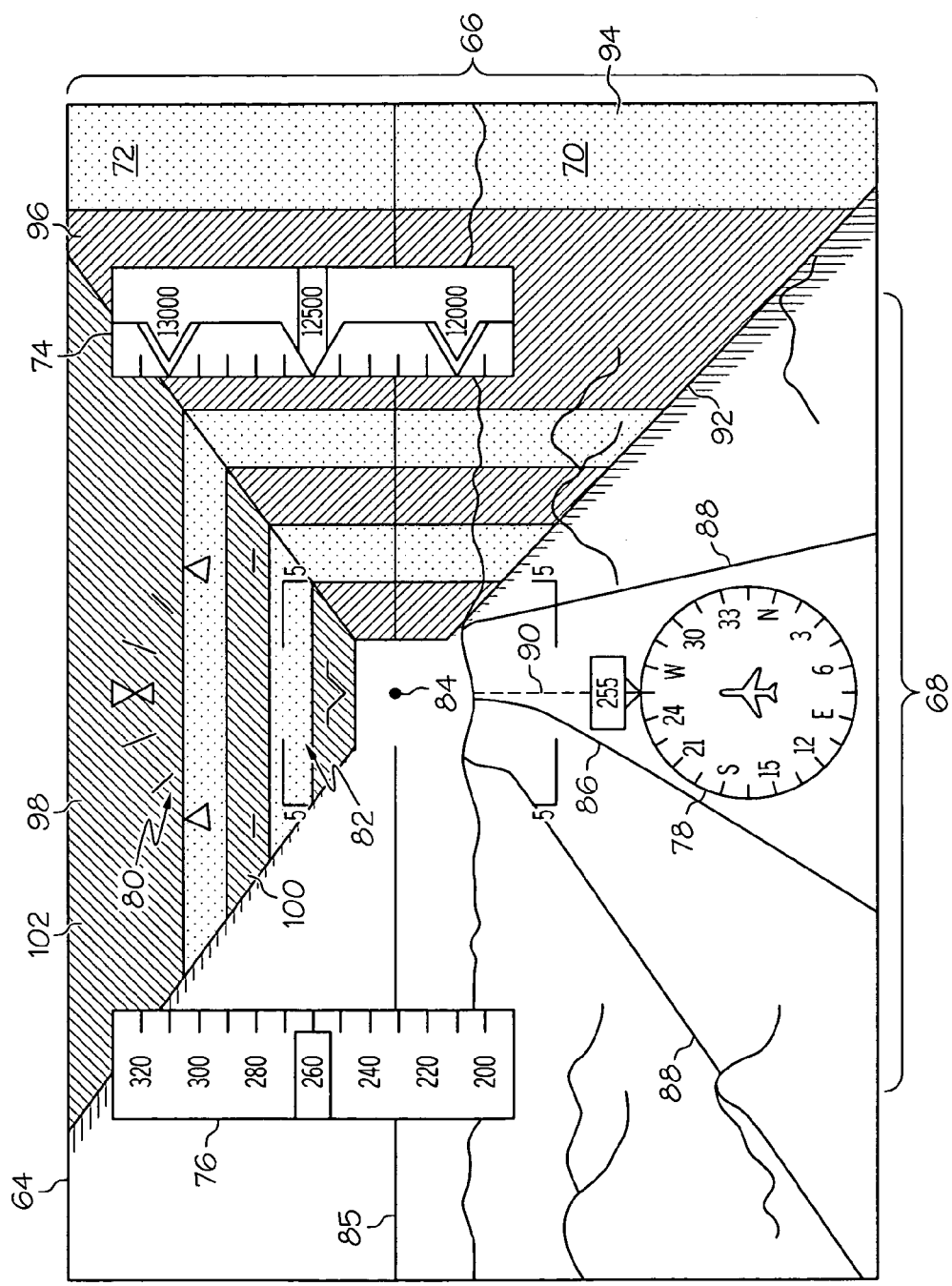
FIG. 5 is a plan view of the display screen of FIG. 2, illustrating the operation thereof with the aircraft in a fourth position over the actual terrain.

FIG. 5 illustrates the display screen 64 with the aircraft 10 having deviated from the flight plan 86 towards the boundary trace 88 on the starboard side (i.e., in a fourth position) of the aircraft 10. In a manner similar to that described above, as the aircraft 10 distance between the aircraft 10 and the boundary trace 88 decreases, a corridor wall 92 (similar to that described above) is generated over the respective boundary trace 88. Although not specifically shown, the luminance of the corridor wall 92 is also incrementally increased as the aircraft 10 navigates closer to the corridor wall 92.

Still referring to FIG. 5, a corridor ceiling 98 may also be shown to indicate a maximum altitude (if applicable) of the navigation corridor in which the aircraft 10 is operating. Similar to the corridors walls 92, the corridor ceiling 98 includes first 100 and second 102 segments, with the transparency of the second segments 102 being less than that of the first segments 100. Although not shown, it should be understood, that the luminance of the corridor ceiling 98 may be increased as the aircraft 10 navigates towards the corridor ceiling 98 (i.e., as the altitude of the aircraft 10 is increased). It should also be understood that a corridor floor (not shown) may be similarly displayed to indicate a minimum altitude (if applicable) of the navigation corridor.

It should be noted that in the embodiments shown in FIGS. 3-5 the luminance of the corridors walls 92 may in effect be adjusted by the proximity of the aircraft 10 itself to the actual navigation corridor boundaries. That is, as the aircraft 10 navigates towards one of the boundaries, at least a portion of the instantaneous flight path of the aircraft 10 (as indicated by the flight path marker 90) is moved closer to the boundary, even if the flight path does not intersect one of the boundaries (e.g., the flight path is parallel to the boundary).

Figure 6:
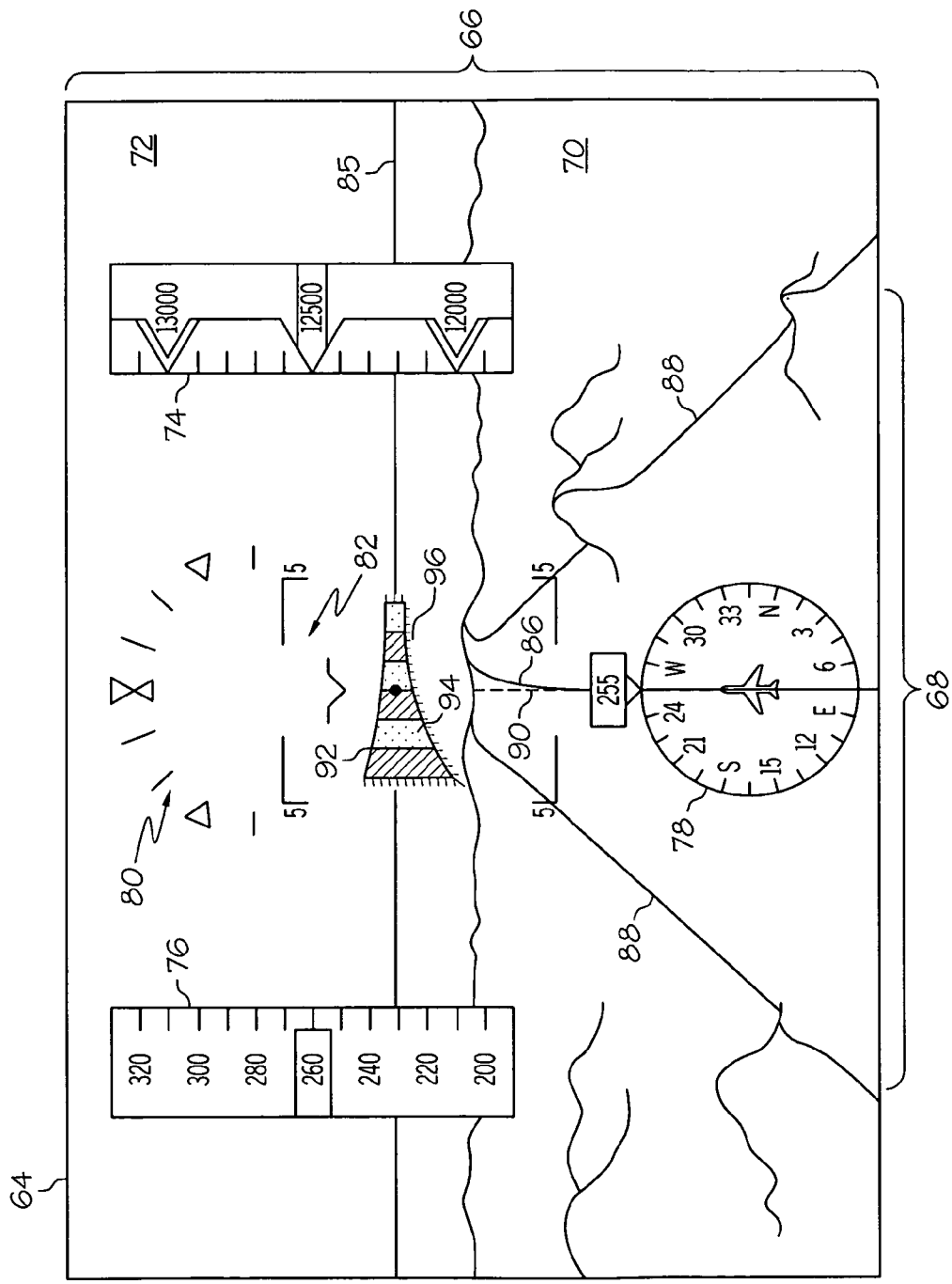
FIG. 6 is a plan view of the display screen of FIG. 2, illustrating the operation thereof, according to another embodiment of the present invention.

FIG. 6 illustrates the operation of the display device 18 (and/or the display screen 64) according to another embodiment, or aspect, of the present invention. In FIG. 6, the aircraft 10 is positioned substantially over the flight plan 86 (similar to FIG. 2). However, the aircraft 10 is approaching a curve or bend in the navigation corridor to the starboard side of the aircraft 10, as indicated by the curves in the flight plan 86 and the boundary traces 88 (and/or arrows on the corridor wall that are not shown in the depicted embodiment). As a result, the flight path 90 (or a predicted flight path) of the aircraft 10 intersects the boundary trace 88 on the port side of the aircraft 10. In one embodiment, a section of a corridor wall 92 (e.g., a predetermined number of the first 94 and second 96 segments) is displayed to indicate to the user 28 that the current flight path 90 (or a predicted flight path) crosses the corridor wall 92 (i.e., that the aircraft 10 will exit the navigation corridor if the present heading or track is maintained). In one embodiment, as the aircraft 10 approaches the section of the corridor wall 92 that is intersected by the flight path 90, that section of the corridor wall 92 increases in luminance (and size/shape) in a manner similar to that described above. In another embodiment, only the curved portions of the corridor walls 92 (corresponding to turns in the flight plan 86) are shown regardless of any intersection of the flight path 90 with the walls 92.

One advantage of the method and system described above is that the appearance of the corridor boundaries (e.g., the corridor walls 92 and the corridor ceiling 98) provides the user 28 with a visual indication that the aircraft 10 is approaching a boundary of the navigation corridor and/or that the aircraft 10 will exit the navigation corridor is the present track (and/or flight path angle) is maintained (i.e., the user 28 is provided with an indication that the present flight path 90 of the aircraft 10 is within a predetermined distance of one of the corridor boundaries). Another advantage is that because the corridor boundaries are not displayed when the aircraft 10 is not within the predetermined distance of one of the corridor boundaries (or when the flight path 90 does not intersect one of the corridor boundaries), the user's view of the terrain on the display screen 64 is not unnecessarily obscured. A further advantage is that although the corridor boundaries increase in luminance as the aircraft 10 approaches, but maintains (at least in one embodiment) some transparency, the user 28 may still observe the portions of the terrain over which the corridor boundaries are displayed.

Other embodiments may utilize the method and system described above on vehicles other than aircraft, such as land vehicles and watercraft (e.g., in conjunction with a GPS display). The method and system may also be used on unmanned vehicles, in which the display screen is a component of a remote control system (e.g., unmanned aerial vehicle (UAV) ground station), as well as three-dimensional maps, as are commonly understood. The symbology should also understood to not be limited to conventional symbology, and may also include such imagery as sensor images, synthetic images, library images, conformal images, or any other content.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a display device associated with a vehicle comprising:

causing a first image to be displayed on the display device, the first image being at least representative of an actual terrain over which the vehicle is navigating;

rendering a second image over the first image on the display device, the second image comprising a flight plan and a digital navigation corridor boundary corresponding to an actual navigation corridor boundary of an actual navigation corridor in which the vehicle is navigating, the digital navigation corridor boundary indicating a boundary for a buffer zone around the flight plan; and increasing a luminance of at least a portion the digital navigation boundary on the display device based on a proximity of a trajectory of the vehicle to the actual navigation corridor boundary.

2. The method of claim 1, wherein the luminance of the at least a portion of the digital navigation boundary is increased as a distance between the trajectory of the vehicle and the actual navigation corridor boundary decreases.

3. The method of claim 2, wherein the increasing the luminance of the at least a portion of the digital navigation boundary comprises at least one of:
increasing a luminance of a first portion of the digital navigation corridor boundary based on a distance between the vehicle and a first portion of the actual navigation corridor boundary corresponding to the first portion of the digital navigation corridor boundary; and
increasing a luminance of a second portion of the digital navigation corridor boundary if the trajectory of the vehicle intersects a second portion of the actual navigation corridor boundary corresponding to the second portion of the digital navigation corridor boundary on the display device.

4. The method of claim 3, wherein the second image further comprises a plurality of symbology indicative an operational state of the vehicle.

5. The method of claim 4, wherein one of the first and second images comprises a trajectory indicator and first and second navigation corridor boundary indicators on opposing sides of the trajectory indicator.

6. The method of claim 1, wherein the vehicle is an aircraft.

7. The method of claim 6, wherein the display device is a head-down display device and the first image is a digital terrain image being representative of the actual terrain.

8. The method of claim 6, wherein the display device is a head-up display device and the first image is a view of a user on-board the aircraft of the actual terrain.

9. The method of claim 7, wherein the digital navigation corridor boundary is one of a lateral digital navigation corridor boundary and a vertical digital navigation corridor boundary.

10. The method of claim 9, wherein the digital navigation corridor boundary comprises a series of alternating first and second movement indicators thereon.

11. A method for operating a display device on-board an aircraft comprising:
causing a first image to be displayed on the display device, the first image being at least representative of a view of a user on-board the aircraft;
rendering a second image over the first image on the display device, the second image comprising a flight path and a digital navigation corridor boundary corresponding to an actual navigation corridor boundary of the actual navigation corridor in which the aircraft is navigating, the digital navigation corridor boundary indicating a boundary for a buffer zone around the flight path; and
increasing a luminance of at least a portion of the digital navigation boundary on the display device based on a proximity of a flight path of the aircraft to the actual navigation corridor boundary.

12. The method of claim 11, wherein the display device is a head-up display (HUD) device and the first image is the view of the user on-board the aircraft through the HUD device of an actual terrain over which the aircraft is navigating.

13. The method of claim 11, wherein the display device is a head-down device and the first image is a digital terrain image that is representative the view of the user on-board the aircraft of an actual terrain over which the aircraft is navigating.

14. The method of claim 13, wherein the increasing the luminance of at least a portion of the digital navigation boundary comprises at least one of:
increasing a luminance of a first portion of the digital navigation boundary based on a distance between the aircraft and a first portion of the actual navigation corridor boundary corresponding to the first portion of the digital navigation boundary; and
increasing a luminance of a second portion of the digital navigation boundary if the flight path of the aircraft intersects a second portion of the actual navigation corridor boundary corresponding to the second portion of the digital navigation boundary on the display device.

15. The method of claim 14, wherein the actual navigation corridor is defined by a flight plan and a Required Navigation Performance (RNP) buffer on opposing sides of the flight plan.

16. An avionics system comprising:
a display device that is viewable by a user of an aircraft;
a processor in operable communication with the display device, the processor being configured to:
generate a first image on the display device, the first image being representative of an actual terrain over which the aircraft is navigating;
generate a second image over the first image on the display device, the second image comprising a flight plan and a digital navigation corridor boundary corresponding to an actual navigation corridor boundary of an actual navigation corridor in which the aircraft is navigating, the digital navigation corridor boundary indicating a boundary for a buffer zone around the flight plan; and
increasing a luminance of at least a portion the digital navigation boundary on the display device based on a proximity of a trajectory of the aircraft to the actual navigation corridor boundary.

17. The avionics system of claim 16, wherein the luminance of the at least a portion of the digital navigation boundary is increased as a distance between the trajectory of the aircraft and the actual navigation corridor boundary decreases.

18. The avionics system of claim 17, wherein the increasing the luminance of the at least a portion of the digital navigation boundary comprises at least one of:
increasing a luminance of a first portion of the digital navigation corridor boundary based on a distance between the aircraft and a first portion of the actual navigation corridor boundary corresponding to the first portion of the digital navigation corridor boundary; and
increasing a luminance of a second portion of the digital navigation corridor boundary if the trajectory of the aircraft intersects a second portion of the actual navigation corridor boundary corresponding to the second portion of the digital navigation corridor boundary on the display device.

19. The avionics system of claim 18, wherein the display device is a liquid crystal display (LCD).

20. The avionics system of claim 18, further comprising a storage device having Required Navigation Performance (RNP) data stored thereon.

* * * * *